(12) United States Patent
Harvey et al.

(10) Patent No.: US 9,784,848 B2
(45) Date of Patent: Oct. 10, 2017

(54) SYSTEM AND METHOD FOR POSITION DETERMINATION USING LOW EARTH ORBIT SATELLITES

(75) Inventors: Michael Harvey, Centreville, VA (US);
Craig Malone, Lansdowne, VA (US);
Uday Shankar, Herndon, VA (US);
Mike Walgren, Chantilly, VA (US);
Corwin Walker Young, Herndon, VA (US)

(73) Assignee: SkyBitz, Inc., Herndon, VA (US)

( * ) Notice: Subject to any disclaimer, the term of this patent is extended or adjusted under 35 U.S.C. 154(b) by 1630 days.

(21) Appl. No.: 13/078,453

(22) Filed: Apr. 1, 2011

(65) Prior Publication Data

US 2016/0109581 A1    Apr. 21, 2016

Related U.S. Application Data

(60) Provisional application No. 61/320,615, filed on Apr. 2, 2010, provisional application No. 61/384,366, filed on Sep. 20, 2010, provisional application No. 61/388,251, filed on Sep. 30, 2010.

(51) Int. Cl.
| | |
|---|---|
| G01S 19/42 | (2010.01) |
| G01S 5/00 | (2006.01) |
| G01S 19/43 | (2010.01) |
| G01S 19/25 | (2010.01) |
| G01S 19/46 | (2010.01) |
| G01S 19/09 | (2010.01) |

(52) U.S. Cl.
CPC ............ *G01S 19/42* (2013.01); *G01S 5/0036* (2013.01); *G01S 19/25* (2013.01); *G01S 19/43* (2013.01); *G01S 19/09* (2013.01); *G01S 19/252* (2013.01); *G01S 19/258* (2013.01); *G01S 19/46* (2013.01)

(58) Field of Classification Search
CPC .......... G01S 19/42; G01S 19/09; G01S 19/25; G01S 19/252; G01S 19/258; G01S 19/43; G01S 19/46; G01S 5/0036
USPC .......... 342/357.64, 357.31, 357.25; 701/517, 701/518, 468, 469
See application file for complete search history.

(56) References Cited

U.S. PATENT DOCUMENTS 5,758,261 A * 5/1998 Wiedeman ........... H04B 7/1856
455/13.1
5,955,986 A 9/1999 Sullivan
(Continued)

FOREIGN PATENT DOCUMENTS

EP    1346236 B1    6/2009

OTHER PUBLICATIONS

International Preliminary Report on Patentability, Oct. 11, 2012.
International Search Report and Written Opinion, Jun. 24, 2011.

*Primary Examiner* — Chuong P Nguyen
(74) *Attorney, Agent, or Firm* — Toering Patents PLLC

(57) ABSTRACT

A system and method for position determination using low earth orbit satellites. A mobile terminal affixed to an asset initiates a collection of global positioning system satellite measurements (e.g., code phase) based on a hardware trigger generated by a low earth orbit satellite modem. Timing information reflective of the time of the hardware trigger pulse is transmitted to an operations center along with the global positioning system satellite measurements to enable the operations center to determine a position of the mobile terminal.

5 Claims, 8 Drawing Sheets

(56) References Cited

U.S. PATENT DOCUMENTS

| | | | |
|---|---|---|---|
| 5,969,669 A * | 10/1999 | Ishikawa | H04B 7/18547 |
| | | | 342/357.2 |
| 6,078,284 A * | 6/2000 | Levanon | G01S 5/0027 |
| | | | 342/357.64 |
| 6,094,162 A | 7/2000 | Sullivan | |
| 6,107,959 A * | 8/2000 | Levanon | G01S 5/0036 |
| | | | 342/357.64 |
| 6,154,171 A | 11/2000 | Sullivan | |
| 6,169,514 B1 | 1/2001 | Sullivan | |
| 6,243,648 B1 | 6/2001 | Kilfeather et al. | |
| 6,400,319 B1 | 6/2002 | Castelloe et al. | |
| 6,480,788 B2 | 11/2002 | Kilfeather et al. | |
| 6,560,536 B1 * | 5/2003 | Sullivan | G01S 5/0036 |
| | | | 342/357.64 |
| 6,725,158 B1 | 4/2004 | Kilfeather et al. | |
| 6,807,158 B2 * | 10/2004 | Krishnamurthy | H04B 7/18563 |
| | | | 370/316 |
| 7,092,725 B2 * | 8/2006 | Anderson | H04B 7/1855 |
| | | | 455/12.1 |
| 7,583,225 B2 | 9/2009 | Cohen et al. | |
| 7,623,871 B2 * | 11/2009 | Sheynblat | G01S 1/026 |
| | | | 342/357.31 |
| 7,782,811 B2 * | 8/2010 | Battista | H04B 7/18539 |
| | | | 370/320 |
| 8,155,640 B1 * | 4/2012 | Battista | H04B 7/18539 |
| | | | 370/321 |
| 8,830,124 B1 * | 9/2014 | Akbari | G01S 19/24 |
| | | | 342/357.26 |
| 9,213,103 B2 * | 12/2015 | Whelan | G01S 19/23 |
| 9,661,483 B2 * | 5/2017 | Bastianelli | H04W 4/22 |
| 2003/0058163 A1 * | 3/2003 | Zimmerman | G01S 5/009 |
| | | | 342/357.72 |
| 2008/0233866 A1 * | 9/2008 | Burtner | H04B 7/185 |
| | | | 455/13.1 |
| 2008/0233970 A1 * | 9/2008 | Burtner | G01S 19/09 |
| | | | 455/456.1 |
| 2014/0266867 A1 * | 9/2014 | Liu | G01S 1/042 |
| | | | 342/200 |

* cited by examiner

Red circle = satellite footprint
Black circles = beam footprints

SYSTEM AND METHOD FOR POSITION DETERMINATION USING LOW EARTH ORBIT SATELLITES

This application claims priority to provisional application No. 61/320,615, filed Apr. 2, 2010, provisional application No. 61/384,366, filed Sep. 20, 2010, and provisional application No. 61/388,251, filed Sep. 30, 2010. Each of the above-identified applications is incorporated by reference herein, in its entirety, for all purposes.

BACKGROUND

Field of the Invention

The present invention relates generally to tracking and monitoring and, more particularly, to a system and method for position determination using low earth orbit satellites.

Introduction

Tracking mobile assets represents a growing enterprise as companies seek increased visibility into the status of movable assets (e.g., trailers, containers, etc.). Visibility into the status of movable assets can be gained through mobile terminals (MTs) that are affixed to the assets. These MTs can be designed to generate position information that can be used to update status reports that are provided to customer representatives.

In one conventional system, a MT is designed to collect observation data and forward the observation data to a central location. Position calculations can then be performed at the central location rather than at the MT. Since the MT need only be active long enough to gather the observation data, the MT experiences minimal battery drain. In providing a service that can be applied globally, what is needed is a system that can operate with a low earth orbit satellite communication network.

SUMMARY

A system and/or method for position determination using low earth orbit satellites, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Wireless communication networks provide excellent monitoring capabilities due to their wide-ranging coverage. These wireless communication networks can be used to enable reporting of a position of a mobile terminal (MT). In one embodiment, a position of the MT can be determined by the centralized facility using GPS data that is measured by the MT.

Figure 1:
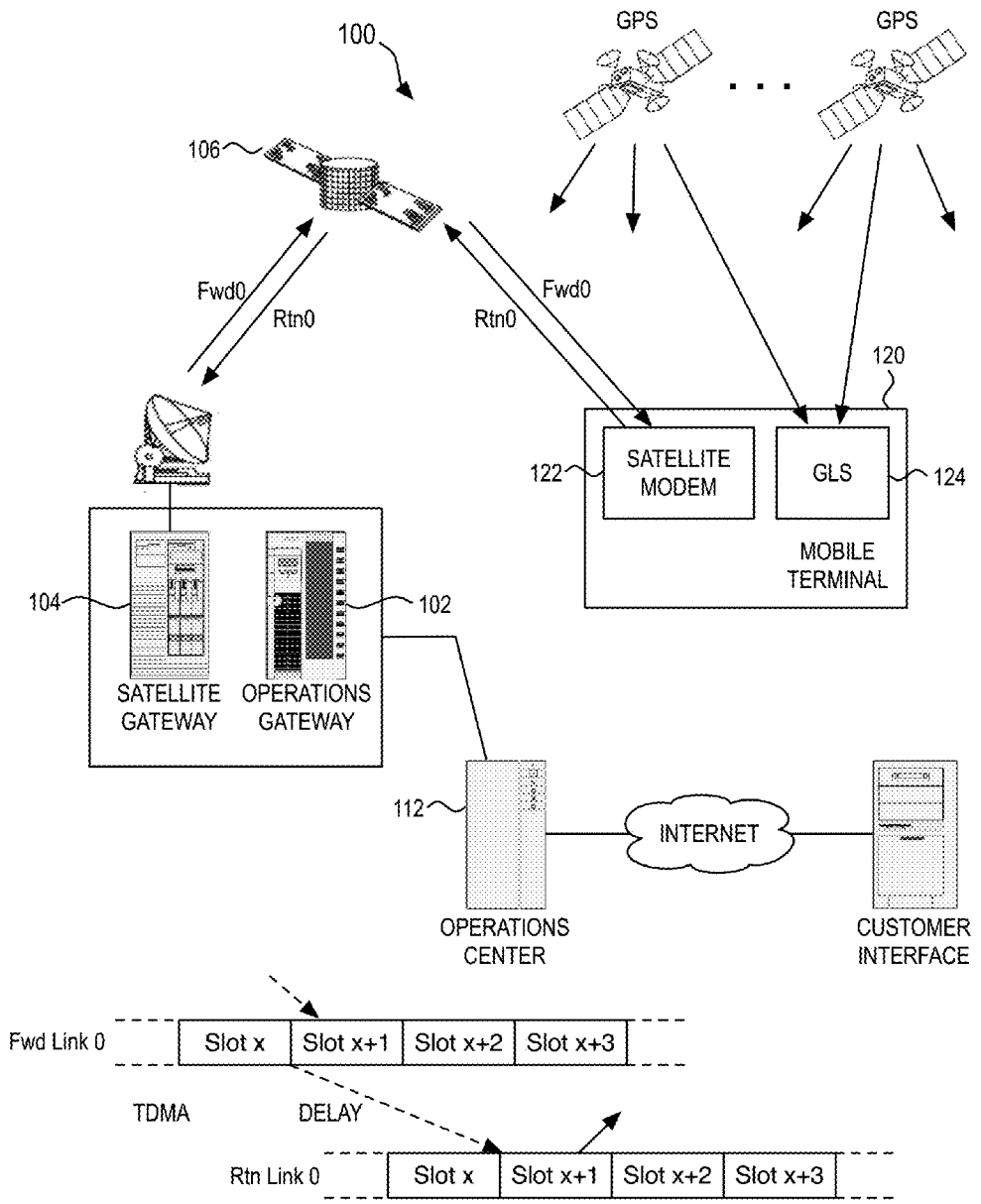
FIG. 1 illustrates an embodiment of a satellite network in communication with a mobile terminal on an asset.

FIG. 1 illustrates an embodiment of a conventional asset tracking system that includes operations gateway 102, communicating with MT 120 on an asset (or asset transporter). As would be appreciated, the asset can be embodied in various forms such as a trailer, a railcar, a shipping container, or the like.

Communication between operations gateway 102 and MT 120 is facilitated by satellite gateway 104 at the ground station and satellite modem 122 in MT 120. Both satellite gateway 104 and satellite modem 122 facilitate communication using one forward and one return link (frequency) over geosynchronous or geostationary (GEO) satellite 106.

In one embodiment, the satellite communication is implemented in a time division multiple access (TDMA) structure, which consists of 57600 time slots each day, per frequency or link, where each slot is 1.5 seconds long. On the forward link, operations gateway 102 sends a message or packet to MT 120 on one of the 1.5 second slots. Upon receipt of this message or packet, MT 120 would then perform a GPS collection (e.g., code phase measurements) using global locating system (GLS) module 124 or to perform sensor measurements and transmit the data back to operations gateway 102 on the return link, on the same slot, delayed by a fixed time defined by the network. In one embodiment, the fixed delay defines a length of time that enables MT 120 to decode the forward packet, perform the data collection and processing, and build and transmit the return packet.

In one embodiment, MT 120 can be configured to produce periodic status reports. In this configuration, MT 120 would wake up periodically, search for its assigned forward slot, perform data collection and processing, and transmit the status report on the assigned return slot. In another embodiment, MT 120 can be configured to produce a status report upon an occurrence of an event (e.g., door opening, motion detected, sensor reading, etc.). In this configuration, MT 120 would wake up upon occurrence of an event, search for an available forward slot, perform data collection and processing, and transmit the status report on the return slot corresponding to the identified available forward slot.

Upon receipt of a status report from MT 120, operations gateway 102 passes the information to operations center 112. Operations center 112 can then use the received GPS collection to calculate a position solution using a least squares method. This position solution along with any other status information (both current and historical) can be passed to a customer via the Internet.

Figure 2:
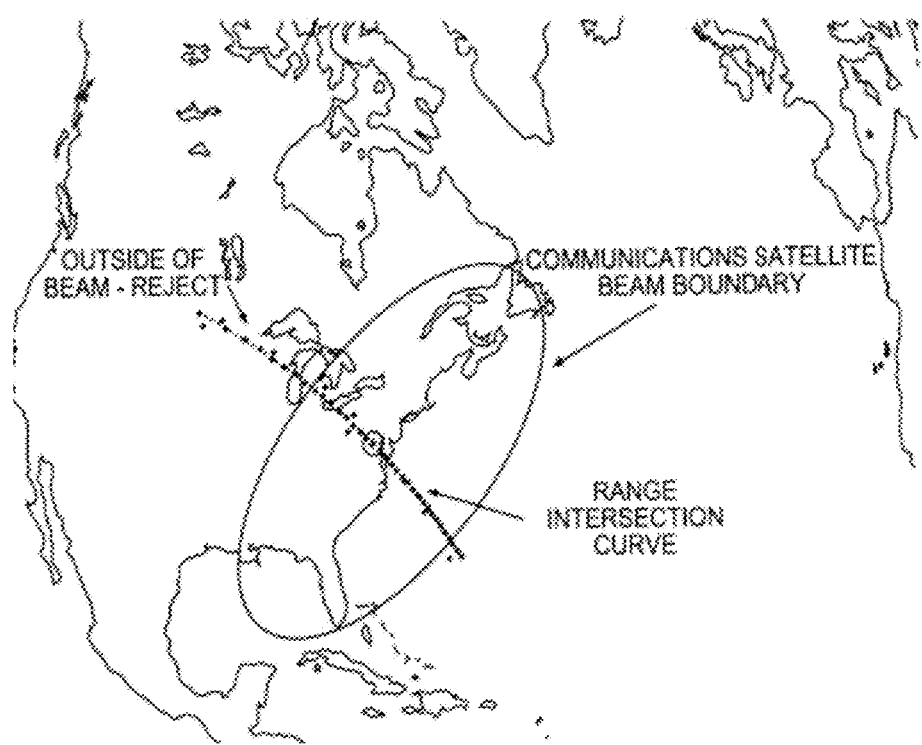
FIGS. 2 and 3 illustrates a geographical representation of an intersection curve.

A detailed description of this communications process is provided in U.S. Pat. No. 6,243,648, entitled "Fast Acquisition Position Reporting System," which is incorporated herein by reference in its entirety. As described, an MT initiates a position report in response to a gateway request packet sent to it. The MT may obtain any information on preferred satellites from the forward packet or gateway-broadcast information. The MT notes the precise timing of the forward (inbound or gateway-to-MT) packet and schedules position data collection and data reporting from this time. The MT detects satellites in view by detecting the presence of radio energy at a GPS frequency using spreading codes specific to each satellite. The MT detects the timing offsets for each code relative to a baseline, which could be, for example, time of measurement or any of the satellites' signal. After precise measurement, the MT encodes a return packet with the measured offsets for the code of each satellite observed and sends the packet to the gateway at a specific time offset from receipt of the forward packet. The round trip time for the MT's response to the forward packet transmission is determined by subtracting known MT processing and scheduling delays, and calculating round trip time for the query-response transaction with the MT. If the MT sent an unsolicited position report, the packet sent in the forward timeslot corresponding to the timeslot containing the position report is used as the start time for round trip time measurement. An intersection arc on the surface of the earth for which the measured round trip time would apply can be determined, and the arc can be truncated with the outside boundaries of the satellite beam in which the MT operated. An example of a range intersection curve is illustrated in FIG. 2.

Figure 3:
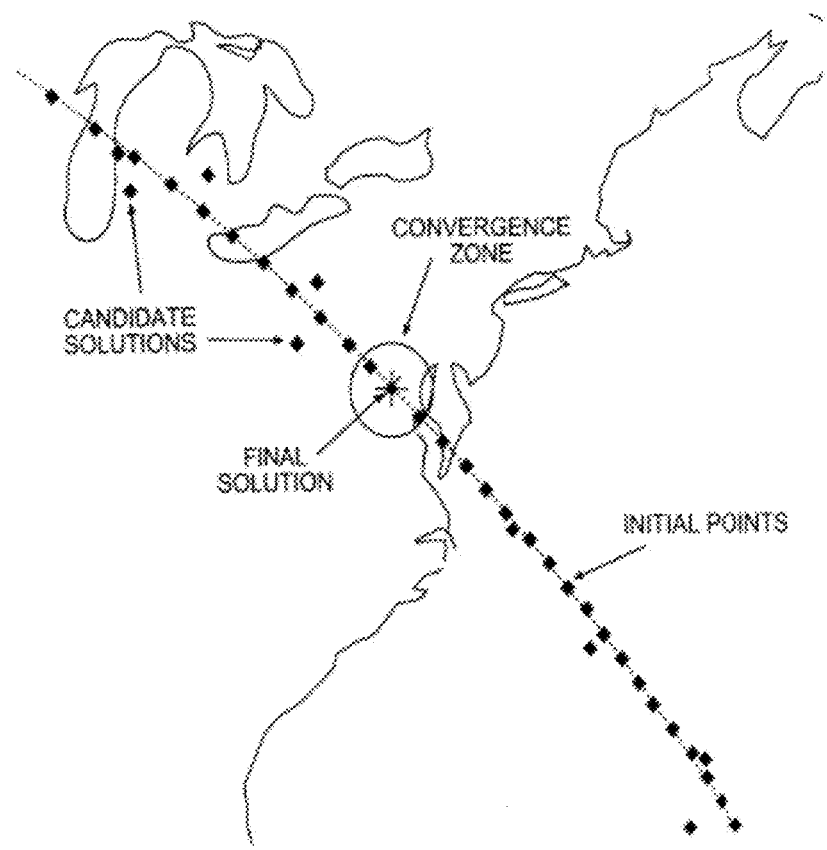

As illustrated in FIG. 3, arbitrarily calculated seed positions along the arc can be used as starting points from which to calculate the closest point for which the reported code offsets from the MT would all apply. Several final positions can result from this process within the area of operations. If more than one position results, the position with the best attributes is chosen as the true position of the MT. Attributes could include the solution's distance to the intersection arc calculated above, vertical distance from the known earth's surface elevation at the resulting points, mathematical residuals (measure of disagreement among multiple line crossings defining a solution position) for the solved point, etc.

While a single GEO satellite can cover as much as 40 percent of the earth's surface, a GEO satellite is typically configured to focus its transmission and increase its signal strength over a defined service area. These large service areas can still dictate that a MT is configured to communicate with a single GEO satellite.

In providing MT tracking and data services to a global set of customers, the reliance of the MT on GEO satellites can lead to competitive disadvantages. For example, MT tracking and data services in a different GEO communication satellite service area would often require the negotiation of agreements with different communication satellite service providers. These international negotiations can unnecessarily hinder or delay the introduction of mobile terminal services across an entire international marketplace.

It is a feature of the present invention that an MT can be provided that has the capability to communicate with LEO satellites to enable position determination by an operations center. An example of such a LEO satellite network is the Iridium satellite network. In general, LEO satellites orbit the earth between 400-1000 miles above the earth's surface. Because LEO satellites are not fixed in space in relation to the rotation of the earth, they move at very high speeds such that a LEO satellite can go across the visible horizon in approximately 10 minutes. When the first LEO satellite moves out to the horizon, another LEO satellite becomes available for communication. As the network of LEO satellites traverse the globe, so also does the MT tracking and data service area enabled by the LEO satellite network.

Figure 4:
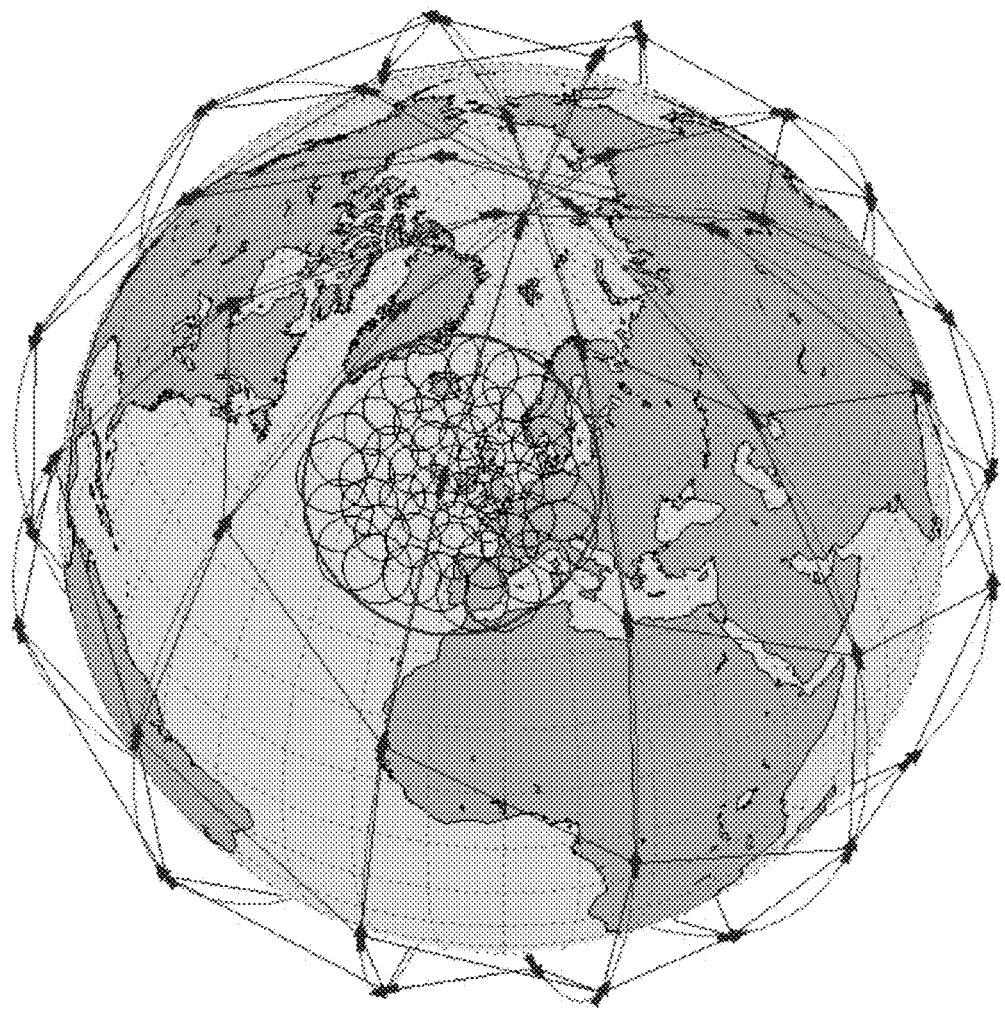
FIG. 4 illustrates a LEO satellite network.

FIG. 4 illustrates an example of a LEO satellite network, wherein the satellite footprint and the plurality of beam footprints are shown for a single LEO satellite. Determination of a position of an asset using the LEO satellite network is now described with reference to the MT configuration of FIG. 5 and the position determination process of FIG. 6.

Figure 5:
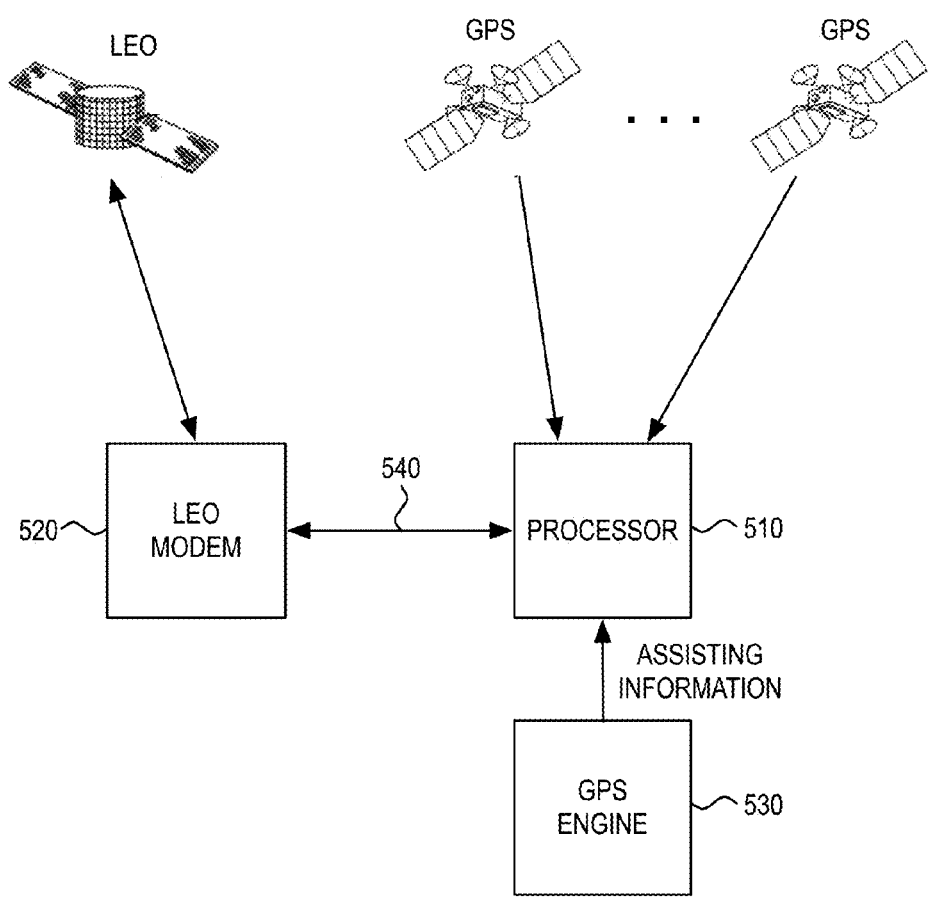
FIG. 5 illustrates a LEO configuration.

As illustrated in FIG. 5, the MT configuration on an asset to be tracked includes processor 510 and LEO modem 520. In one embodiment, processor 510 and LEO modem 520 are coupled via interface 540, such as an RS-232 interface. An example of LEO modem 520 is Iridium's 9602 satellite data transceiver.

In one embodiment, processor 510 a GLS processor that can be designed to collect code phase measurements from a plurality of GPS satellites. In one embodiment, in the absence of knowledge of a specific set of GPS applicable to the MT, processor 510 is designed to look for GPS signals from all 32 GPS satellites.

In an alternative embodiment, processor 510 is designed to look for GPS signals from a subset of the 32 GPS satellites. In this embodiment, the MT can be designed to further include GPS engine 530, which is designed to determine a position based on received GPS satellite signals. In general, a GPS signal contains three different types of information: a pseudorandom code that identifies which GPS satellite is transmitting information, ephemeris data that contains information about the status of the satellite (healthy or unhealthy), current date and time, and almanac data that tells GPS engine 530 where each GPS satellite should be at any time throughout the day.

In the present invention, information that can assist processor 510 in identifying a subset of the 32 GPS satellites to look for is provided by GPS engine 530 to processor 510. In one example, the assisting information can include current almanac information that would enable processor 510 to determine which GPS satellites are in view of the MT. Here, it should be noted that GPS engine 530 can be powered on periodically (e.g., every two weeks) to keep the almanac information current. In another example, the assisting information can include ephemeris information that would enable processor 510 to determine which GPS satellites are bad and should be excluded from the search. In general, the assisting information can represent any information that can enable processor 510 to reduce the number of GPS satellites that are searched for.

In yet another embodiment, the number of GPS satellites that the MT searches for can be reduced based on the relationship of the period of individual LEO satellites relative to the GPS constellation. In this embodiment, the MT can be designed to generate a table over time that identifies the GPS satellites in view relative to a LEO satellite's position. Each time the MT identifies a set of GPS satellites in view, the MT can store such information in a table that is indexed by a LEO satellite ID and its relative position in its satellite orbit period. As this table is generated over time, the MT can consult the table contents using the LEO satellite ID and satellite orbit period information to identify a list of GPS satellites that should be included in the search. This would obviate the need to perform a manual GPS satellite search. If a table lookup does not yield a list of GPS satellites, then the subsequent list of GPS satellites that is identified in a search can be stored in the table relative to the LEO satellite ID and satellite orbit period for future reference. By this process an index into a set of GPS satellites in view is generated over time.

This reduction of the number of GPS satellites produces an intelligent search that can reduce the time that processor 510 is active. For example, a search for all 32 GPS satellites can take 20 seconds, while a search for eight satellites can take approximately seven seconds. This reduction in time during which processor 510 is active serves to further reduce the amount of power consumed by the MT in producing a scheduled or unscheduled position report. As would be appreciated, this reduction in time serves to reduce the amount of power consumed by the MT, thereby lengthening the service life of the battery that powers the MT. Correspondingly, the lengthening of the service life of the battery serves to reduce the maintenance costs associated with servicing the MTs deployed in the field.

In one embodiment, the timing of the code phase collection by processor 510 is based on a hardware pulse generated by LEO modem 520. This hardware pulse can be generated in response to a modem request issued by processor 510 and represents a trigger for a collection of code phase measurement data by processor 510. After collection of the code phase measurement data, processor 510 forwards the code phase measurement data to LEO modem 520 via interface 540 for delivery to the operations center.

In an alternative embodiment, the LEO modem can be designed to incorporate functionality that looks for GPS signals from a set of GPS satellites. In this embodiment, interface 540 is used by processor 510 to command LEO modem 520 to perform the data collection and processing. Interface 540 can also be used to pass information to LEO modem 520 that can be used to reduce the search for GPS satellites. As would be appreciated, such information can also include a particular search order, a list of GPS satellites that should be ignored, and other configuration data that would enable LEO modem 520 to collect the necessary measurements in a reduced time period, thereby enabling conservation of power by the MT.

In one embodiment, LEO modem 520 also provides in addition to the code phase measurement data, the LEO satellite ID, the beam ID, timing information that enables determination of the GPS collect time, and the propagation time from the MT to the LEO satellite. The use of this information by the operations center in determining a position of the MT is now described with reference to the flowchart of FIG. 6.

As illustrated, the process begins at step 602 where the operations center uses the timing information to determine the collection time of the GPS code phase measurements. Next, at step 604, the operations center next uses the two-line orbital elements (TLEs) to determine the xyz coordinates and velocity of the identified LEO satellite. Based on the determined xyz coordinates and velocity of the identified LEO satellite, the operations center can then determine, at step 606, the center of the identified LEO satellite beam by consulting a static table of azimuths and central angles.

Figure 7:
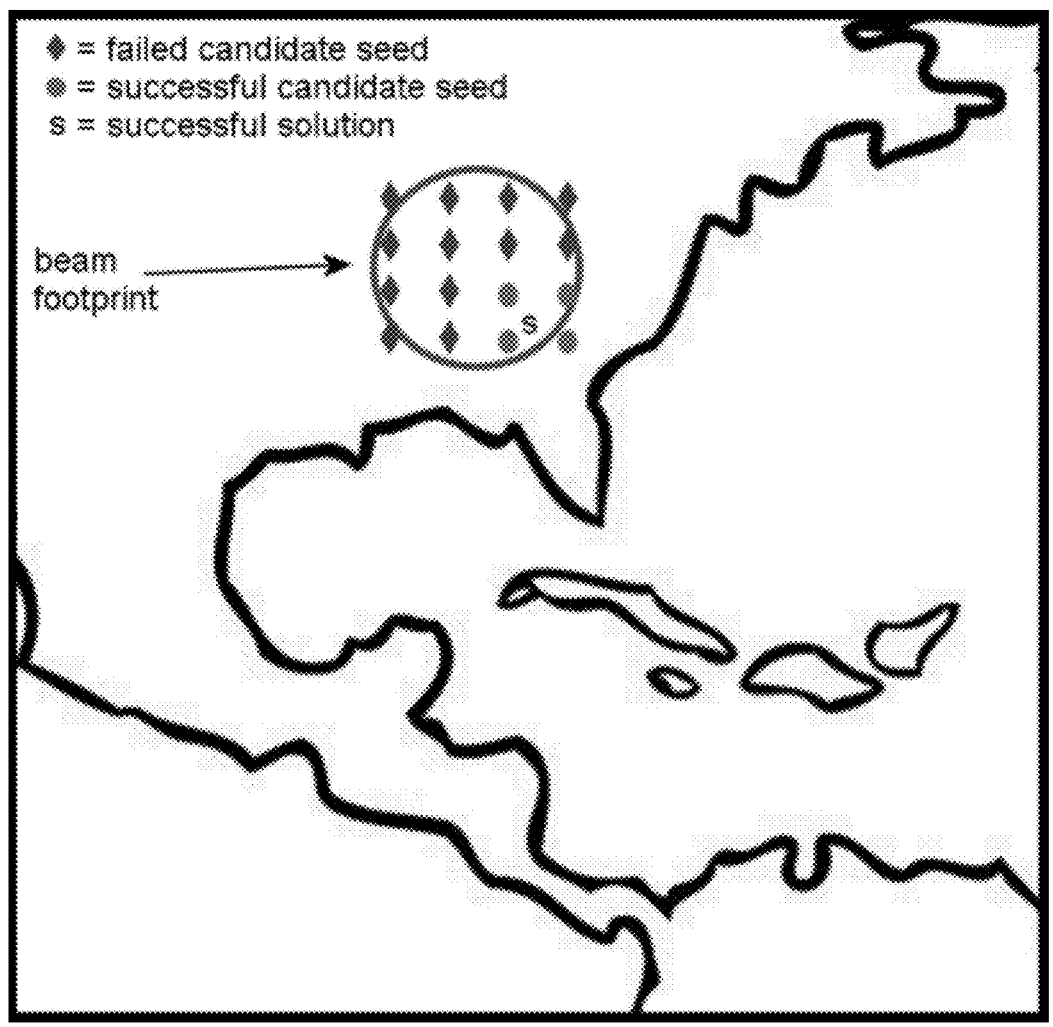
FIG. 7 illustrates a set of candidate seed points within a LEO satellite beam.

The identification of the beam center enables the operation center to generate, at step 608, a set of candidate seed points based on the beam center. As illustrated in FIG. 7, the footprint of the identified LEO satellite beam is relatively small, which allows for a manageable number of candidate seed points. In one embodiment, a grid of candidate seed points over the beam footprint is defined (e.g., 5×5, 7×7, etc.).

It should also be noted that the operation center can also receive a rough position estimate (e.g., latitude/longitude) of the MT along with a confidence estimate. In one embodiment, this confidence estimate can be in the form of a number of kilometers in which the MT is believed to be within a 70-80% certainty. When the confidence estimate is suitably precise, then the rough position estimate can be used as a single seed candidate for determining a position solution. For example, if the confidence estimate indicates that the MT is believed to be within 40 kilometers of the rough position estimate with a 70-80% certainty, then the operations center can use the rough position estimate as a single seed candidate that would be sufficient to determine the location of the MT.

Thus, where the confidence estimate is suitably precise, a grid of candidate seed points such as that illustrated in FIG. 7 need not be generated. Where the confidence estimate is not suitably precise, however, then a grid of candidate seed points would be generated by the operation center.

A further benefit of receiving a rough position estimate (e.g., latitude/longitude) of the MT is that it can be used by the operation center to determine positioning of the various GPS satellites in view of the MT. This knowledge of the positioning of the GPS satellites can be used to weed out code phase measurements from certain GPS satellites based on their angle of elevation. As the MT can be designed to search for and take measurements from all 32 GPS satellites, the knowledge of the positioning of the GPS satellites relative to the MT can enable the operation center to remove from consideration any measurements that can be considered unreliable.

Figure 6:
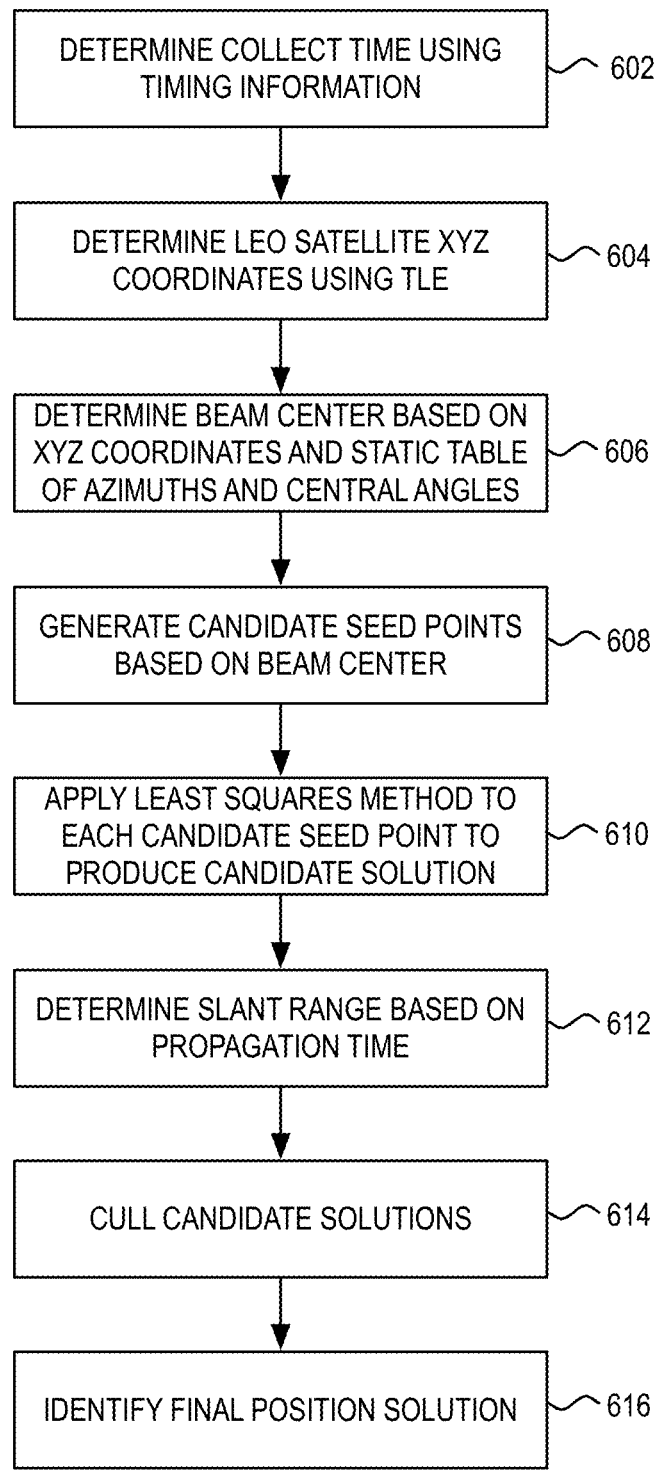
FIG. 6 illustrates a flowchart of a process of the present invention.

Returning to the flowchart of FIG. 6, after the operation center uses GPS ephemeris data to determine positions of the GPS satellites, the operation center can then apply, at step 610, a least squares method to each candidate seed. As described in the communication process of U.S. Pat. No. 6,243,648, each candidate seed point will converge to a candidate solution.

At step 612 the slant range between the MT and the LEO satellite is then determined using the propagation time. This slant range can be used at step 614 to cull the set of candidate solutions. More specifically, the difference between the candidate solution slant range and the determined slant range must be less than some nominal value. Altitude can also be used to cull candidate solutions. Here, the altitude of the candidate solution must fall within some nominal range. This range can be tightened when terrain data is available. Also, the root mean square of residual (RESRMS) can be used to cull candidate solutions. This metric, which results from the least squares method, characterizes how well the candidate solution matches the data from which it was derived. Lower values indicate better matches and the value of RESRMS must be less than some nominal value. As would be appreciated, the specific set of culls used at step 614 would be implementation dependent.

After the culls implemented at step 614 are performed, at step 616, any candidate solutions that remain are examined to ensure that they all converge to very nearly the same location. If they do, then that location is considered to be the determined location of the MT. In one embodiment, the solution can be refined using atmospheric models and other methods.

Figure 8:
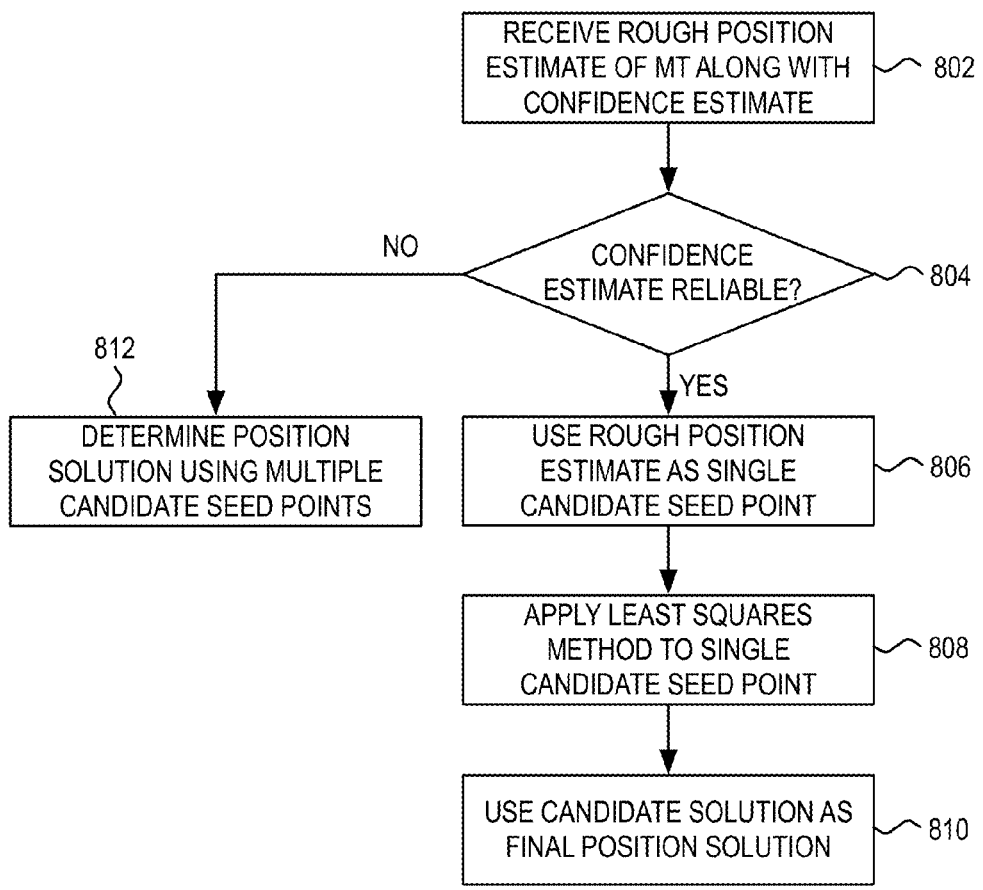
FIG. 8 illustrates a flowchart of a second process of the present invention.

As noted above, a position determination process using multiple candidate seed points can be obviated based on the receipt by the operation center of a rough position estimate along with a sufficiently high confidence estimate. This high-level process is illustrated in the flowchart of FIG. 8.

As illustrated, the process begins at step 802 where the operation center receives the rough position estimate of the MT along with the confidence estimate. As would be appreciated, the specific form of the rough position estimate (e.g., latitude and longitude) and its significance to the confidence estimate can vary by implementation. In general, the confidence estimate is a structured mechanism by which the operation center can determine whether the rough position estimate is within a convergence zone around the MT. Here, the convergence zone refers to an area around the location of the MT in which a candidate seed point must lie to guarantee that the position calculation will converge to the location of the MT. The size of the convergence zone (see FIG. 3) will vary depending on number, quality and type of observation data used. In one example, the convergence zone for the code phase observations is approximately a radius of 75-80 km.

With a convergence zone in the range of 75-80 km, an examination of the confidence estimate at step 804 can determine whether the rough position estimate provided to the operation center is sufficient to produce a final position solution of the MT. Assume for example, that the confidence estimate provided indicates a 70% certainty that the rough position estimate is within 20 km of the location of the MT. In this example, the analysis at step 804 can generate a reliable indication that the rough position estimate is within the convergence zone of 75-80 km. Conversely, if the confidence estimate provided indicates a 50% certainty that the rough position estimate is within 90 km of the location of the MT, then the analysis at step 804 can generate an unreliable indication that the rough position estimate is within the convergence zone of 75-80 km.

In the later case, the unreliable indication generated at step 804 would lead to a determination of a position solution using multiple candidate seed points such as that illustrated in FIG. 7. In other words, an unreliable indication generated at step 804 would yield to a position determination process such as that described in the flowchart of FIG. 6.

If, on the other hand, the analysis at step 804 generates a reliable indication, then the process continues to step 806 where the operation center can use the rough position estimate as a single candidate seed point. The least squares method is then applied to the single candidate seed point at step 808 to produce a single candidate solution. This single candidate solution is used as the final position solution at step 810. As would be appreciated, the application of a least squares method to a single candidate seed point represents a vast computational savings as compared to the application of a least squares method to a grid of candidate seed points.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a mobile terminal affixed to an asset, comprising:
    generating, by a low earth orbit satellite modem incorporated into the mobile terminal and in response to a global positioning system measurement collection request, a hardware trigger pulse;
    initiating, in response to said generated hardware trigger pulse, a collection of global positioning system measurements; and
    transmitting, by said low earth orbit satellite modem, a communication to an operations center that includes said global positioning system measurements and timing information indicative of a time of generation of said hardware trigger pulse, said communication enabling said operations center to determine a position of the asset to which the mobile terminal is affixed.

2. The method of claim 1, wherein said collection of global positioning system measurements are performed by said low earth orbit satellite modem.

3. The method of claim 1, wherein said communication also includes a satellite identifier, a beam identifier, and a propagation time from said mobile terminal to said low earth orbit satellite.

4. The method of claim 1, wherein said communication also includes a rough position estimate and a confidence estimate.

5. The method of claim 1, wherein said global positioning system measurements are code phase measurements.

* * * * *